Dec. 1, 1931.   T. P. HINGLEY   1,834,839
CONSTRUCTION OF COUPLINGS OR CLAMPS FOR SCAFFOLDING OR OTHER PURPOSES
Filed Dec. 9, 1930
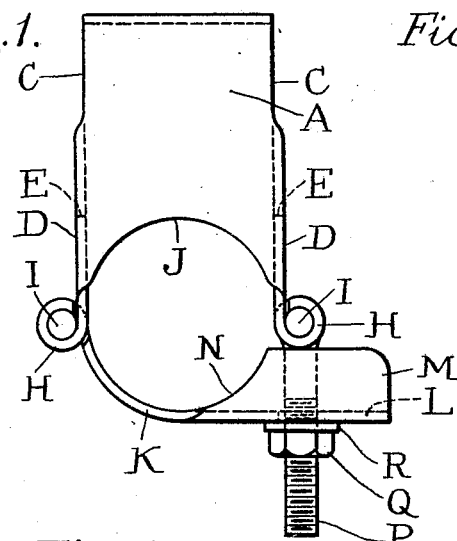
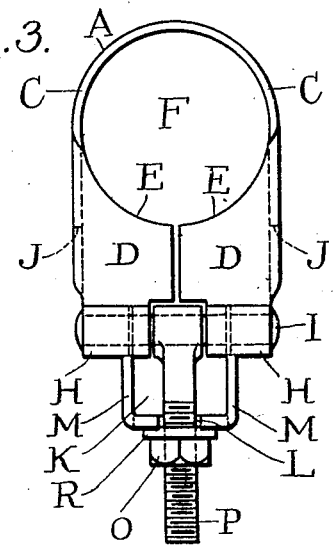
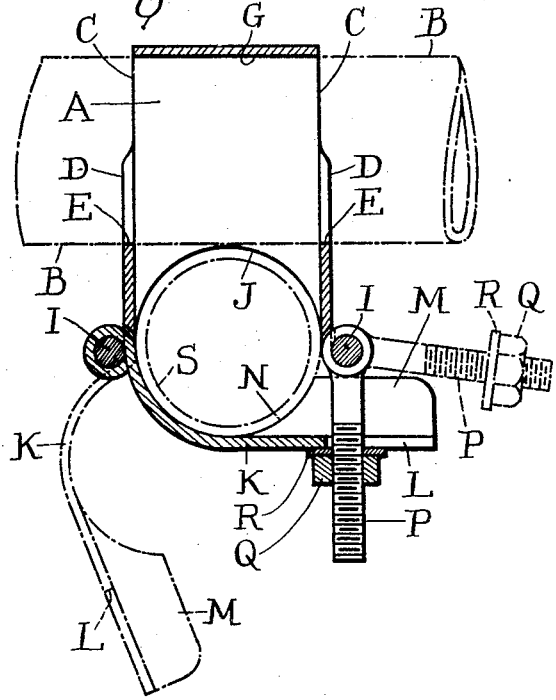
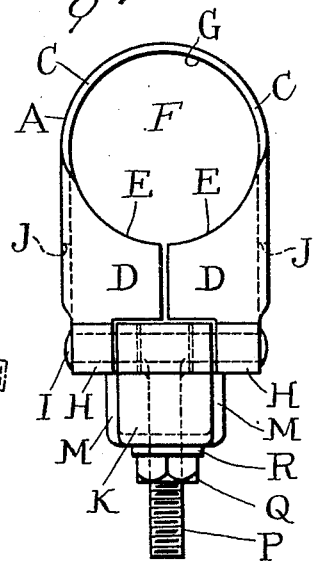
INVENTOR
Thomas P. Hingley,
BY
ATTORNEY Patented Dec. 1, 1931

1,834,839

UNITED STATES PATENT OFFICE

THOMAS PROSSER HINGLEY, OF LONDON, ENGLAND

CONSTRUCTION OF COUPLINGS OR CLAMPS FOR SCAFFOLDING OR OTHER PURPOSES

Application filed December 9, 1930, Serial No. 501,152, and in Great Britain January 6, 1930.

This invention relates to that class of coupling or clamp employed in connecting the ledger to the putlog or tubes or rods positioned at right angles to each other in tubular or other metal scaffolding, and in which the coupling embraces one tube and is constructed to carry the other tube, the tubes being clamped together by screw means employed with the coupling.

The object of this invention is to construct such a coupling in an improved manner and whereby all the elements are constructed as one article, and there is no material projection above the horizontal tubes to interfere with the proper laying of a scaffold board.

For the purpose of this invention I construct the clamp or coupling from a U-shaped member having a recessed portion in each wall with the upper edges of the recesses curved, turned in portions between the walls at the open end, bearings at the ends of each turned in portion, a strap or plate curved at one portion and flat at the other, the flat portion having upturned walls and a slot extending from the end, the strap being hinged to one of the bearings at its curved end, and a bearing pin carrying a screw-threaded bolt and nut hingedly connected with the other bearing.

My invention will be clearly understood from the following description and the annexed drawings, in which Figure 1 is an elevation of the coupling or clamp in the closed condition.

Figure 2 is a sectional elevation of the coupling or clamp showing its connection to a putlog and ledger.

Figure 3 is an elevation of the coupling or clamp at a right angle to Figure 1.

Figure 4 is an elevation of the coupling or clamp as viewed from the opposite side of Figure 3.

The device consists of two members and a bolt and nut.

One member A, i. e. the one to encircle the putlog B is made U-shaped with plain edges C for a distance about or slightly greater than half the diameter of the putlog B to which it is to be connected and from the lower portion of the plain edges C on each side I turn in portions of the walls, as at D, so that their edges are close together at the centre, and I cut away the upper edges E, E of these turned in portions D, D to provide a clear approximately round space F between the upper edges E, E and the curved portion G of the member A in which the putlog B can be positioned, see Figures 3 and 4.

The lower ends of the turned in portions D, D are bent into substantially cylindrical form to serve as bearings H, H for hinge pins I, I.

Below the top edges of the turned in pieces D, D the side walls of the U-structure A are partly cut away, the lower edges of the walls being rounded upwardly, as at J, see Figure 1.

To the bearings H, H at one side I hinge a strap or plate K, which curves downwardly from the hinge pin I toward the opposite bearings H and then straight toward and below the latter bearings. The straight portion of the strap or plate K has a slot L extending from its free end and the opposite edges of said straight portion are turned up as at M, M to form parallel walls with their inner ends N, N cut away as a curve, so as to form substantially a half circle with the curved portion of the plate K.

On the pin I in the bearings H, H on the other side of the member A I hinge a screw-threaded bolt P carrying a nut Q and washer R.

In assembling the parts, the coupling is positioned on the putlog B, shown in Figure 2 in broken lines, the upper curved part of the U-structure A resting on the putlog and with the other parts depending below the latter, the hinged strip K and bolt P hanging free, whereupon the ledger S, shown in Figure 2 in broken lines, is positioned in the U-member A below and bearing against the putlog B and the curved strap or plate K is swung up under the ledger S to bring its curved portion and the curved ends N of the turned up edges M of its straight portion in engagement with the ledger S.

The bolt P is now positioned within the slot L of the curved strap or plate K and when the nut Q is screwed up on said bolt it will engage the underside of the strap K and firmly hold the whole together, as shown in full lines in Figure 2, the plate K and bolt P being indicated in broken lines in the positions they may assume when released.

The hinge pins I, I are secured in their bearings H, H preferably by being burred over at their ends. What I do claim as my invention and desire to obtain by Letters Patent is:—

A coupling or clamp for metal scaffolding and other purposes for securing tubes or rods at right angles to each other, comprising a U-shaped member having a recessed portion in each wall with the upper edges of the recesses curved, turned in portions between its walls at the open end, and bearings at the ends of each turned in portion, a strap curved at one portion and flat at the other, the flat portion having upturned walls and a slot extending from its end, said strap being hinged to one of the bearings at its curved end; and a bearing pin carrying a screw-threaded bolt and nut and hingedly connected with the other bearing.

In testimony whereof I have hereunto set my hand.

THOMAS PROSSER HINGLEY.